Figure 1:
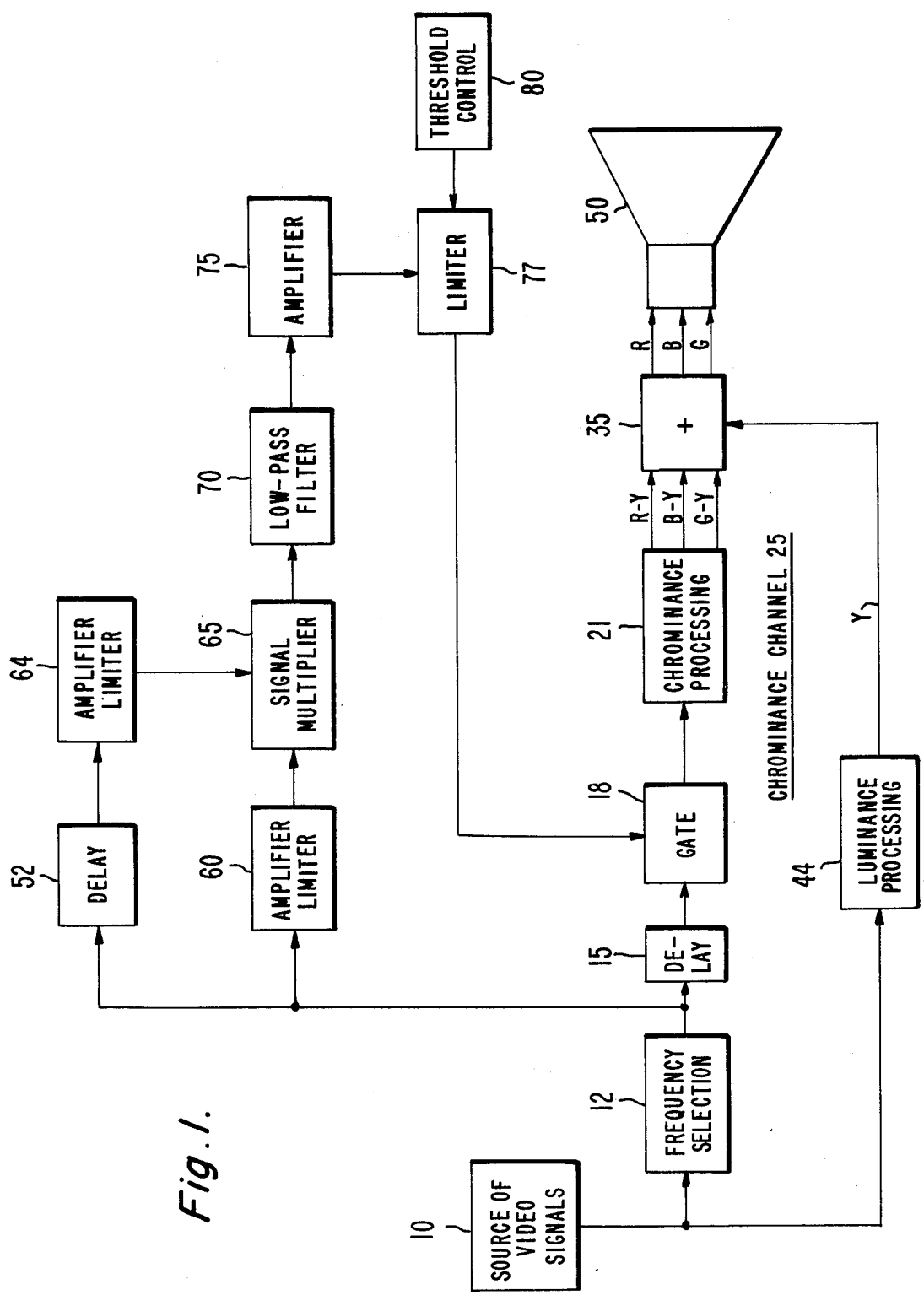

United States Patent [19]
Holmes

[11] 4,167,020
[45] Sep. 4, 1979

[54] SUPPRESSION OF LUMINANCE SIGNAL CONTAMINATION OF CHROMINANCE SIGNALS IN A VIDEO SIGNAL PROCESSING SYSTEM

[75] Inventor: David D. Holmes, Trenton, N.J.

[73] Assignee: RCA Corporation, New York, N.Y.

[21] Appl. No.: 859,863

[22] Filed: Dec. 12, 1977

[51] Int. Cl.² ................................................ H04N 9/535
[52] U.S. Cl. ........................................ 358/36; 358/40; 358/31
[58] Field of Search .................................. 358/31, 36–40, 358/26, 27, 167; 325/479–482, 473–476, 478

[56] References Cited

U.S. PATENT DOCUMENTS

| | | | |
|---|---|---|---|
| 2,580,148 | 12/1951 | Wirkler | 325/476 |
| 3,778,543 | 12/1973 | Lowry | 333/70 T |
| 3,836,707 | 9/1974 | Murakami et al. | 358/31 |
| 4,030,121 | 6/1977 | Faroudja | 358/37 |

OTHER PUBLICATIONS

Kiver, *Color Television Fundamentals,* McGraw-Hill, 1964, p. 42.
Barton, "A Practical Charge-Coupled Device Filter for the Separation of Luminance and Chrominance Signals in a Television Receiver," *IEEE Trans. on Consumer Electronics,* vol. CE-23, No. 3, Aug. 1977, pp. 342–357.
Turner, "Some Thoughts on Using Comb Filters in the Broadcast Television Transmitter and at the Receiver", *IEEE Trans. on Consumer Electronics,* vol. CE-23, No. 3, Aug. 1977, pp. 248–257.

*Primary Examiner*—John C. Martin
*Attorney, Agent, or Firm*—Eugene M. Whitacre; William H. Meagher; Ronald H. Kurdyla

[57] ABSTRACT

Apparatus in a video signal processing system for improving the quality of a reproduced color image by reducing visible "cross-color" interference caused when high frequency luminance signals occur within the passband of the chrominance component of the video signal. Video signals within the chrominance passband are sensed by a signal multiplier responsive to the video signal and to the video signal delayed by a given amount. The amount of delay corresponds to an interval during which rapid luminance transitions capable of producing the high frequency signals within the chrominance passband can occur. The multiplier generates a control signal indicative of the presence of the luminance transitions, which is then utilized for controlling the chrominance signal processing channel such that objectionable cross-color effects otherwise visible in a reproduced image are reduced or eliminated.

11 Claims, 2 Drawing Figures

SUPPRESSION OF LUMINANCE SIGNAL CONTAMINATION OF CHROMINANCE SIGNALS IN A VIDEO SIGNAL PROCESSING SYSTEM

This invention relates to color video signal processing systems and, in particular, to apparatus in a color television system for reducing cross-color interference produced when high frequency luminance information within the frequency range of chrominance signals causes erroneous demodulated color signals to be produced.

A color image reproduced in response to an image representative video signal is primarily defined by the luminance and chrominance components of the video signal. A color television signal processing system such as a color television receiver commonly includes a chrominance channel for processing the chrominance component exclusive of the luminance component, and a luminance channel for processing the luminance component exclusive of the chrominance component. The chrominance channel usually includes an input tuned bandpass filter for selectively coupling chrominance signals to the chrominance channel, thereby preventing most luminance signals from interfering with the chrominance signals processed by the chrominance channel.

High frequency luminance signals may be undesirably coupled to and processed by the chrominance channel when these signals are within the chrominance passband. These luminance signals represent false chrominance information which causes erroneous demodulated color signals to be produced. A resulting visible effect of such false information in a reproduced image is sometimes referred to as "cross-color" interference.

Cross-color interference represents an objectionable distraction which obscures highly detailed luminance areas of a picture with patterns which scintillate in color. Cross-color interference is particularly noticeable when sharp, parallel vertical or diagonal black-to-white image edge transitions (e.g., associated with striped or grill patterns) are produced in response to luminance signal amplitude transitions containing high frequency components within the chrominance passband. These high frequency luminance components simulate color information which, when demodulated, causes the sharp image edge transitions to "light up" with a spectrum of colors. Fine edge detail is thereby obscured and the quality of a reproduced image is impaired.

In essence, high frequency luminance signals within the chrominance passband represent uncorrelated (dissimilar) information relative to chrominance signal information. One system for improving the quality of a reproduced color image in the presence of uncorrelated video signal information is disclosed in my copending U.S. patent application Ser. No. 778,594, entitled "Improved Comb Filter Apparatus", a continuation-in-part of my abandoned U.S. patent application Ser. No. 678,394 and assigned to RCA Corporation. In that system, a comb filter employed to separate the frequency interleaved luminance and chrominance components of a composite color television signal is gain controlled in response to uncorrelated chrominance information in order to suppress otherwise visible, distracting effects produced by contamination of the luminance signal by uncorrelated chrominance information. Another system for improving the quality of a reproduced color image is described in my copending, concurrently filed U.S. patent application Ser. No. 859,922 entitled, "Suppression Of Chrominance Signal Contamination Of The Luminance Signal In A Video Signal Processing System," assigned to the same assignee as the present invention. That case describes a system wherein objectionable vertical edge dots produced in response to uncorrelated chrominance information are reduced or eliminated.

Apparatus according to the present invention for improving the quality of a reproduced color image is included in a video signal processing system including means for reproducing a color image in response to image representative luminance and chrominance components of the video signal, the luminance component being susceptible of rapid amplitude transitions including high frequency components within the range of chrominance frequencies. The system also includes a chrominance channel for processing the chrominance component, and a frequency selection network for selectively coupling video signals within the chrominance frequency range to the chrominance channel. The selectively coupled signals are delayed a predetermined amount corresponding to an interval during which the transitions can occur. A signal detector responsive to the delayed selectively coupled signals and to relatively undelayed selectively coupled signals provides an output signal representative of the transitions occurring during the interval. The output signal is then utilized for controlling signals processed by the chrominance channel to suppress the high frequency components.

Figure 2:
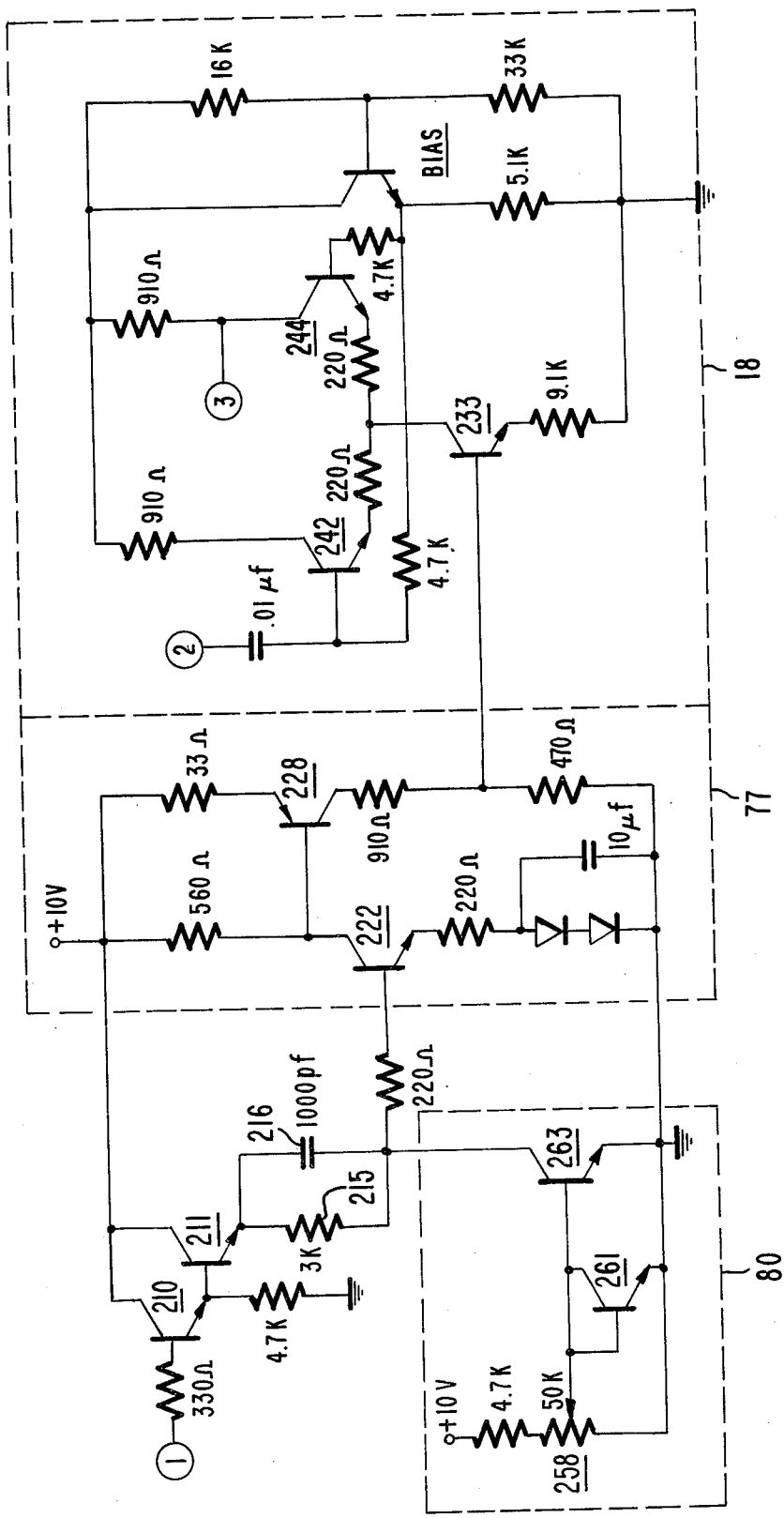

In the drawing,

FIG. 1 illustrates in block diagram form a portion of a color television receiver including apparatus in accordance with the present invention; and FIG. 2 shows a schematic circuit diagram of a portion of the apparatus illustrated in FIG. 1.

The following discussion is given in the context of a television signal processing system in accordance with NTSC standards adopted by the United States. Referring to FIG. 1, a source of video signals 10 provides a composite color television signal including chrominance and luminance components by means of conventional television signal processing circuits responsive to received radio frequency signals.

Video signals from source 10 are coupled to a frequency selection unit 12 and to a luminance signal processing unit 44. Frequency selection unit 12 selectively passes video signal frequencies within the chrominance frequency range ($3.58 \pm 0.5$ MHz), which are then transmitted via an equalizing delay network 15 and a normally conductive controlled gate 18 to a chrominance signal processing unit 21 in a chrominance channel 25 of the receiver. Chrominance processing unit 21 includes amplification and demodulation stages for deriving demodulated R-Y, B-Y and G-Y color difference signals in known fashion. The color difference signals are combined with a luminance output signal Y from luminance processor 44 in a signal combining network 35 for developing R, B and G color signals, which are then coupled to inputs of a color image reproducing kinescope 50.

Signals from the output of unit 12 are also coupled to inputs of a delay unit 52 (e.g., a lumped parameter L-C network or charge transfer device) and an amplifier-limiter 60. Delay unit 52 provides a predetermined signal delay of approximately 140 nanoseconds in this example. The delayed signal from delay 52 is amplified and limited by a unit 64, and is applied to one input of a signal multiplier 65 of the synchronous detector type. Another input of multiplier 65 receives amplified and limited undelayed signals from the output of limiter 60.

Limiters 60 and 64 serve to remove amplitude variations from the delayed and undelayed signals coupled to multiplier 65, and also provide amplification to expand the dynamic range of the signals applied to multiplier 65. Multiplier 65 develops an output control signal indicating the presence of uncorrelated high frequency luminance signals within the chrominance passband during each image line by detecting the relative phases of the delayed and undelayed input signals. The multiplier output control signal essentially is a measure of the correlation of the signals coupled via frequency selection unit 12 over the 140 nanosecond interval. The control signal is then low-pass filtered and amplified by units 70 and 77, respectively.

Amplifier 75 (e.g., a differential amplifier) is arranged to provide an amplified control signal of positive polarity, which is amplitude limited by a limiter 77. The amplitude limited control signal is utilized to control the conduction of gate 18. The control signal applied to gate 18 appears in time coincidence with signals coupled from frequency selection unit 12 via delay 15 to the video signal input of gate 18. For this purpose, delay 15 serves as an equalizing delay by delaying the video signals from frequency selection unit 12 an amount equal to the signal processing delay from the output of unit 12 to the output of limiter 77. A threshold control unit 80 serves to establish a threshold level such that the control signal coupled via limiter 77 is inhibited when the control signal supplied to limiter 77 from amplifier 75 exhibits a positive level less than the threshold level.

A schematic circuit diagram of gate 18, limiter 77 and threshold control 80 is shown in FIG. 2. Suitable circuits for frequency selection unit 12, delay unit 52, limiters 60 and 64, multiplier 60 and low-pass filter 70 are disclosed in my last-mentioned copending, concurrently filed U.S. patent application.

In FIG. 2, the output of amplifier 75 (FIG. 1) is supplied through appropriate signal coupling circuits to a terminal 1 at the input of a buffer stage comprising normally conductive series emitter follower transistors 210 and 211. Signals appearing at an emitter output of transistor 211 are coupled through a network including a resistor 215 and a bypass capacitor 216 to a base input of an amplifier transistor 222, which comprises limiter 77 together with a PNP transistor 228. Amplitude limited signals are coupled from the collector circuit of transistor 228 to a base input of a normally conductive current source transistor 233 included in gate 18. Transistor 233 supplies operating currents for emitter coupled transistors 242 and 244, also included within gate 18.

Frequency selected signals coupled via equalizing delay 15 (FIG. 1) are supplied via suitable buffer circuits to a terminal 2 at a base input of transistor 242 of gate 18. Output signals from gate 18 appear at a collector output of transistor 244 and a terminal 3, from which the output signals are coupled to chrominance signal processing unit 21 (FIG. 1) with proper polarity by means of appropriate signal coupling circuits.

Threshold control unit 80 comprises a pre-set threshold level adjustment potentiometer 258 operatively associated with a source of positive voltage (+10 v), and a current mirror arrangement including a diode connected transistor 261 and a transistor 263. The setting of potentiometer 258 establishes the level of conduction of transistor 263 and thereby the collector output voltage of transistor 263. This voltage in turn establishes the threshold conduction level of transistor 211.

The following description of the operation of the invention is given with reference to the block diagram of FIG. 1.

High frequency luminance signals within the chrominance passband typically exhibit a relatively short duration and a non-periodic, or sporadic, repetition rate. In contrast, chrominance signals are essentially periodic in nature and of longer duration compared to high frequency luminance signals within the chrominance passband. Thus high frequency luminance signals within the chrominance passband are considered to represent uncorrelated signals relative to the chrominance signals.

The predetermined signal delay provided by delay 52 defines an interval within which a high frequency luminance amplitude transition can occur. The delay of 140 nanoseconds chosen in this instance corresponds to one-half the period of the chrominance subcarrier signal (i.e., one-half the reciprocal of the 3.58 MHz subcarrier frequency), and represents a very small interval relative to the horizontal image line scanning interval of about sixty-three microseconds. Although this delay has been found suitable for purposes of determining the presence of a high frequency luminance transition, other delays also can be used (e.g., odd or even multiples of one-half of the chrominance subcarrier signal period) depending on the requirements of a particular system.

The speed at which high frequency luminance amplitude transitions are expected to occur in a particular system should be taken into acount in determining the amount of signal delay to be provided by delay 52. Rapid luminance amplitude transitions are significant since high frequency energy is associated with rapid transitions. The likelihood that high frequency energy will be present increases as the speed of the luminance amplitude transition increases.

The delay should be short enough to define an interval during which a rapid transition can occur in significant part. It should be recognized that a luminance transition will not occur completely within the 140 nanosecond interval, since this would imply a luminance bandwidth greater than the 4.2 MHz bandwidth in an NTSC system. In the case of an NTSC color television signal processing system, the delay of 140 nanoseconds has been found suitable for determining the presence of high frequency luminance transitions within the chrominance passband. It is noted that, with this delay, the output control signal from multiplier 65 will be significantly reduced in the presence of a very long duration transition (i.e., compared with 140 nanoseconds). However, the effectiveness of the system is not impaired in this instance because very long duration transitions are essentially incapable of causing cross-color effects and are therefore of little concern. That is, since the amount of cross-color interference is related to the transient response of the luminance signals, a long duration luminance transition is not likely to contain a significant amount of high frequency energy sufficient to cause cross-color effects.

Illustratively, if the delayed and undelayed input signals to multiplier 65 are substantially devoid of chrominance signals and contain only a long duration luminance transition, the output from multiplier 65 may be reduced by an amount sufficient to inhibit gate 18 and therefore chrominance channel 25 (as will be discussed). A reproduced image is not adversely affected in this instance, since chrominance signals are absent. If the input signals to multiplier 65 contain correlated chrominance signals as well as a long duration luminance transition, the output of multiplier 65 will remain at a positive level, in response to the correlated chrominance signals, sufficient to maintain gate 18 conductive (i.e., open). Chrominance channel 25 will therefore process the signals within the chrominance passband which are then present. However, image quality is not compromised in this case, since long duration luminance transitions then present are not likely to cause cross-color effects.

On the other hand, the delay provided by unit 52 should not be excessively long with respect to the duration of expected high frequency luminance amplitude transitions. An excessive delay is unsuitable for determining the presence of one or more rapid transitions, since one or more of such transitions may be completed well within the longer delay interval. Consequently, multiplier 65 will not be supplied with delayed and undelayed input signals which accurately represent the existence of a rapid transition at a given point in time. In addition, such a delay may cause multiplier 65 to respond to longer duration transitions of the type which do not generate a significant amount of cross-color interference. Multiplier 65 would then provide an unnecessary and undesirable output control signal.

In essence, the output of multiplier 25 is a measure of signal correlation over the 140 nanosecond interval. Signal multiplier 65 develops a maximum positive output signal when the delayed and undelayed input signals represent a correlated signal condition. Multiplier 25 generates a negative-going, less positive output control signal when the phases of the delayed and undelayed input signals correspond to an uncorrelated condition during each horizontal line scanning interval. The magnitude of the output signal is proportional to the degree of dissimilarity between the input signals, whereby a less positive output within a given range corresponds to an uncorrelated condition manifested by the presence of a rapid luminance transition including high frequency signals within the chrominance passband.

Multiplier 65 synchronously detects the phase difference between the delayed and undelayed video signals over a given dynamic range of input signal levels. This dynamic operating range of multiplier 25 is determined by amplifier-limiters 60 and 64, which remove amplitude variations from the video signals supplied to multiplier 65 so that video signals of uniform amplitude are presented to multiplier 65. The amount of signal amplification provided by limiters 60 and 64 is chosen so that relatively small delayed and undelayed video signals equal to and above a given level are amplified to the limiting level. Delayed and undelayed signals below the given level are not limited and cause multiplier 25 to produce an output signal which is a function of the input signal amplitude and phase rather than phase alone. Thus increasing the amplification provided by limiters 60 and 64 serves to increase the dynamic range over which multiplier 65 operates as a phase detector. The amount of amplification and the level at which limiting occurs can be tailored to suit the dynamic signal range requirements of a particular system.

The output of multiplier 65 contains high frequency components as well as a relatively lower frequency component to be used for control purposes. The high frequency components distort the control component and are attenuated by low-pass filter 70, which in this example exhibits a −3 db bandwidth of from zero Hertz (D.C.) to 1.2 MHz. The filtered control signal is then amplified by amplifier 75, and limited by unit 77.

Referring now to the circuit arrangement of FIG. 2, the output signal from multiplier 65, after filtering and amplification, appears at terminal 1. Threshold control potentiometer 258 is set at a desired position for establishing the conduction of transistor 263, and therefore the collector voltage of transistor 263 and the emitter voltage of transistor 211.

When the control signal appearing at terminal 1 exhibits a magnitude within a given range such that the base-emitter junction of transistor 211 is forward biased under correlated signal conditions, the control signal is transmitted via transistor 211 and transistors 222, 228 to transistor 233 of gate 18. Control signals within this range are considered to represent correlated signal conditions in this instance. The amplitude limited control signal from limiter 77 biases transistor 233 to supply operating current for transistors 242 and 244, whereby chrominance signals (then present) are coupled from terminal 2, through gate 18, and appear at gate output terminal 3 from where they are coupled to chrominance processing circuits 21 (i.e., gate 18 is open to permit signal transmission to succeeding circuits).

An uncorrelated condition associated with the presence of high frequency luminance signals in the chrominance passband causes the signal at terminal 1 to become less positive. When this signal is within a given less positive range such that the base voltage of transistor 211 becomes equal to or less than the emitter voltage of transistor 211, transistor 211 is no longer forward biased and ceases conduction. Transistors 222 and 228 in turn are rendered nonconductive, and base bias is removed from transistor 233 of gate 18. Transistor 233 ceases conduction and no longer supplies operating current for transistors 242 and 244. Signals then appearing at gate input terminal 2 therefore do not appear at output terminal 3 since gate 18 is inhibited (closed) for signal transmission to chrominance processor 21.

The threshold level should be set in accordance with the degree of sensitivity required in a particular system. The sensitivity of the system to uncorrelated conditions increases as the threshold level (i.e., the emitter voltage of transistor 211 in FIG. 2) is increased in a positive direction. When the emitter voltage of transistor 211 is large in response to the setting of potentiometer 258, transistor 211 can be cut-off, and gate 18 inhibited, in response to a small drop in the base voltage of transistor 211, as produced in response to the output from multiplier 65 in the presence of relatively less significant uncorrelated signal conditions. However, in this case, gate 18 and chrominance channel 25 may be improperly inhibited in the presence of correlated low level chrominance signals. Low level chrominance signals which cannot be amplified to the limiting level by amplifier-limiters 60 and 64 fall below the dynamic operating range of multiplier 65. As mentioned earlier, the output of multiplier 65 then is a function of the amplitude of such input signals, so that the output of multiplier 65 becomes less positive compared to the output of multiplier 65 when produced in response to higher level correlated chrominance signals. This less positive multiplier output may be sufficient to cut off transistor 211, thereby inhibiting gate 18 and undesirably causing a monochrome image to be displayed. This effect can be minimized by setting potentiometer 258 so that a relatively lower (less positive) threshold control voltage is developed at the emitter of transistor 211. Thus the threshold level setting should take into account the circuit and signal parameters of the particular system.

Limiter 77 assures that the positive control signal appearing at the base of transistor 233 of gate 18 remains substantially constant under correlated conditions (i.e., while transistor 211 is conductive). This prevents the signals coupled via gate 18 from being modulated by changes in the output level of multiplier 65 under signal conditions which are considered to be correlated.

In sum, cross-color interference is eliminated when gate 18 is inhibited as discussed, whereby the interfering high frequency luminance signals are prevented from reaching the color demodulators included in chrominance processing unit 21. False color information simulated by high frequency luminance signals within the chrominance passband is therefore inhibited and fine luminance edge detail of a reproduced image remains unobscured.

Picture quality can also be degraded by impulse noise containing high frequency energy within the chrominance passband. Impulse noise represents an uncorrelated signal condition and can cause scattered flashes of color (e.g., "colored confetti") to appear throughout the picture. Apparatus according to the present invention is capable of reducing this effect in accordance with the principles discussed.

In the described embodiment of the invention, gate 18 is completely closed and signals coupled to chrominance processing unit 21 are inhibited when high frequency luminance components sufficient to cause cross-color effects are present. However, it may be desirable in some cases for gate 18 to conduct a small portion of the video signal present under these circumstances. Illustratively, a color image may include a pattern defined by sharp luminance edge transitions, imposed against or including a light color background. A viewer may object if the background color is removed completely such that a monochrome image is produced when the chrominance channel is cut off completely via gate 18. In this situation, an acceptable compromise may be to have gate 18 conduct a small portion (e.g., 25%) of the signal present when an uncorrelated signal condition is indicated by the output of multiplier 65. Some background color would then remain visible, while cross-color interference would be reduced.

Operation of gate 18 in this manner may also be desirable when it is expected that small, correlated chrominance signals below the dynamic range over which multiplier 65 operates as a phase detector will be regularly encountered. As indicated earlier, such signals are not amplitude limited and cause the output of multiplier 65 to vary as a function of signal amplitude and phase rather than phase alone. A negative-going, less positive multiplier output signal produced in this situation may be sufficient to close gate 18, thereby causing a monochrome image to be reproduced. This potentially distracting result can be rendered less noticeable to a viewer by leaving gate 18 partially open (e.g., 25%) in this event. Some chrominance signal would be coupled via gate 18, and the displayed picture would retain some color.

The arrangement described herein can be employed alone or in combination with the apparatus disclosed in my previously mentioned copending, concurrently filed U.S. patent application entitled, "Suppression Of Chrominance Signal Contamination Of The Luminance Signal In A Video Signal Processing System." The apparatus described therein also serves to improve the quality of a reproduced color image by reducing or eliminating objectionable "edge dots" otherwise produced by uncorrelated chrominance information (i.e., color phase transitions).

While the invention has been described in terms of a preferred embodiment, it should be recognized that various modifications can be made by persons skilled in the art without departing from the scope of the invention. Component values and other examples of operating parameters have been mentioned as an aid to understanding the invention and are not intended to be limiting.

What is claimed is:

1. In a video signal processing system including means for reproducing a color image in response to image representative luminance and chrominance components of successive image line intervals of said video signal, said luminance component being susceptible of rapid amplitude transitions including high frequency components within the range of chrominance frequencies and occurring within said line intervals, said system also including a chrominance channel for processing said chrominance component, apparatus comprising:
   means for selectively coupling video signals within said chrominance frequency range to said chrominance channel;
   means for delaying said selected signals a predetermined amount significantly less than said line interval and less than an interval during which said transitions can occur in significant part;
   signal detector means responsive to said selected signals and to said delayed selected signals for providing an output signal substantially exclusive of high frequency signals including signals within said chrominance frequency range and representative of said transitions occurring during said interval; and
   utilization means responsive to said output signal for controlling signals processed by said chrominance channel to suppress said high frequency components.

2. Apparatus according to claim 1, wherein:
   said delay means provides a signal delay equal to an odd half multiple of the period of said chrominance component.

3. Apparatus according to claim 1, wherein:
   said signal detector means comprises a signal multiplier for detecting the relative phases of said selected signals and said delayed selected signals.

4. In a video signal processing system including means for reproducing a color image in response to image representative luminance and chrominance components of said video signal, said luminance component being susceptible of rapid amplitude transitions including high frequency components within the range of chrominance frequencies, said system also including a chrominance channel for processing said chrominance component, apparatus comprising:
   means for selectively coupling video signals within said chrominance frequency range to said chrominance channel;
   means for delaying said selected signals a predetermined amount corresponding to an interval during which said transitions can occur;
   signal multiplier means responsive to said selected signals and to said delayed selected signals for detecting the relative phases of said selected signals and said delayed selective signals, for providing an output signal representative of said transitions occurring during said interval;

means for limiting the amplitude of said selected signals and said delayed selected signals coupled to said detector means; and utilization means responsive to said output signal for controlling signals processed by said chrominance channel to suppress said high frequency components.

5. Apparatus according to claim 1, wherein:

said output signal from said detector means exhibits a level within a first range during correlated video signal conditions when said high frequency luminance components are absent, and a level within a second range during uncorrelated video signal conditions when said high frequency luminance components are present; and wherein said utilization means comprises gating means responsive to said detector output signal within said second range for attenuating video signals processed by said chrominance channel to suppress said high frequency components.

6. Apparatus according to claim 5, wherein:

said detector output signal is coupled to said gating means via signal translating means, including thresholding means for determining when said gating means is rendered operative to attenuate said video signals in response to said detector output signal within said second range.

7. In a video signal processing system including means for reproducing a color image in response to image representative luminance and chrominance components of said video signal, said luminance component being susceptible of rapid amplitude transitions including high frequency components within the range of chrominance frequencies, said system also including a chrominance channel for processing said chrominance component, apparatus comprising:

means for selectively coupling video signals within said chrominance frequency range to said chrominance channel;

means for delaying said selected signals a predetermined amount corresponding to an interval during which said transitions can occur;

signal detector means responsive to said selected signals and to said delayed selected signals for providing an output signal representative of said transitions occurring during said interval, said detector output signal exhibiting a level within a first range during correlated video signal conditions when said high frequency luminance components are absent, and a level within a second range during uncorrelated video signal conditions when said high frequency luminance components are present; and utilization means comprising gating means responsive to said detector output signal within said second range for attenuating video signals processed by said chrominance channel to suppress said high frequency components; and wherein said detector output signal is coupled to said gating means via signal translating means including means for amplitude limiting said detector output signal within said first range.

8. Apparatus according to claim 5, wherein:

said gating means is disposed in said chrominance channel and supplied at an input with said frequency selected video signals;

said gating means being responsive to said detector output signal within said first range, for enabling said selected video signals to be processed by said chrominance channel; and said gating means being responsive to said detector output signal within said second range, for inhibiting said video signals in said chrominance channel to thereby suppress said high frequency components.

9. Apparatus according to claim 5, wherein:

said gating means is disposed in said chrominance channel for coupling said selected video signals to chrominance signal processing circuits included in said chrominance channel in response to said detector output signal within said first range; and wherein said gating means inhibits a predetermined portion of said selected video signals in response to said detector output signal within said second range.

10. In a color television receiver including a source of video signals and luminance and chrominance channels for processing image representative luminance and chrominance components of successive image line intervals of said video signal, said luminance component being susceptible of rapid amplitude transitions including high frequency components within the range of chrominance frequencies and occurring within said line intervals, apparatus comprising:

means for selectively coupling video signals within said chrominance frequency range from said source of video signals to said chrominance channel;

means for delaying said selected signals a predetermined amount significantly less than said line interval and less than an interval during which said transitions can occur in significant part;

signal detector means responsive to said selected signals and to said delayed selected signals for providing an output signal substantially exclusive of high frequency signals including signals within said chrominance frequency range and representative of said transitions occurring during said interval; and utilization means responsive to said output signal for modifying the conduction of said chrominance channel to suppress said high frequency components.

11. In a color television receiver including a source of video signals and luminance and chrominance channels for processing image representative luminance and chrominance components of said video signal, said luminance component being susceptible to rapid amplitude transitions including high frequency components within the range of chrominance frequencies, apparatus comprising:

means for selectively coupling video signals within said chrominance frequency range from said source of video signals to said chrominance channel;

delaying means for delaying said selected signals by an amount substantially equal to one-half the reciprocal of the frequency of said chrominance component;

signal detector means responsive to said selected signals and to said delayed selected signals for providing an output signal representative of said transitions occurring during the delay interval provided by said delaying means; and utilization means responsive to said output signal for modifying the conduction of said chrominance channel to suppress said high frequency components.

* * * * *